United States Patent
Guedon (10) Patent No.: US 10,540,040 B2
(45) Date of Patent: Jan. 21, 2020

(54) ARCHITECTURE AND DRIVING METHODS FOR MINIMIZING POWER LOSSES IN TOUCH PANEL

(71) Applicant: STMICROELECTRONICS ASIA PACIFIC PTE LTD, Singapore (SG)

(72) Inventor: Yannick Guedon, Singapore (SG)

(73) Assignee: STMICROELECTRONICS ASIA PACIFIC PTE LTD, Singapore (SG)

( * ) Notice: Subject to any disclaimer, the term of this patent is extended or adjusted under 35 U.S.C. 154(b) by 0 days.

(21) Appl. No.: 15/199,332

(22) Filed: Jun. 30, 2016

(65) Prior Publication Data
US 2018/0004347 A1    Jan. 4, 2018

(51) Int. Cl.
G06F 3/041 (2006.01)
G06F 1/32 (2019.01)
G06F 3/044 (2006.01)
G06F 1/16 (2006.01)
G06F 1/3234 (2019.01)

(52) U.S. Cl.
CPC .......... *G06F 3/0418* (2013.01); *G06F 1/1652* (2013.01); *G06F 3/044* (2013.01); *G06F 3/0412* (2013.01); *G06F 1/3262* (2013.01); *G06F 2203/04102* (2013.01)

(58) Field of Classification Search
CPC ...... G06F 3/0418; G06F 1/3262; G06F 3/044; G06F 3/0412; G06F 2203/04102; G06F 1/1652
See application file for complete search history.

(56) References Cited

U.S. PATENT DOCUMENTS

| | | | |
|---|---|---|---|
| 8,432,364 B2 | 4/2013 | Krah | |
| 2009/0212642 A1* | 8/2009 | Krah | G06F 1/3203 307/109 |
| 2013/0076322 A1* | 3/2013 | Tateno | H02M 1/38 323/271 |
| 2013/0321264 A1* | 12/2013 | Park | G06F 3/01 345/156 |
| 2015/0009728 A1* | 1/2015 | Sugita | H02M 3/156 363/45 |
| 2016/0103458 A1* | 4/2016 | Shukla | G05F 1/575 323/280 |

OTHER PUBLICATIONS

Augarten, M., Allergan "Charge Recovery Circuit Maximizes Piezo-electric-Actuator Efficiency" EDN Sensor Design Center, 22-25, Jan. 6, 2011, retrieved Mar. 31, 2016 http://www.edn.com/design/sensors/4363930/Charge-recovery-circuit-maximizes-piezoelectric-actuator-efficiency.
Developing Applications on STM32Cube with Touch Sensing, UM1913 User Manual, DocID028040 Rev 2, Feb. 2016 pp. 1-137.

\* cited by examiner

Primary Examiner — Yaron Cohen
(74) Attorney, Agent, or Firm — Seed Intellectual Property Law Group LLP (57) ABSTRACT

Dual power supply and energy recovery techniques are used in a capacitive touch panel that employs a concurrent drive scheme. A dual supply output buffer boosts a capacitor from an intermediate voltage level to a high voltage level. Energy recovery exchanges stored energy between a capacitor and an inductor. When both techniques are used together, power consumption of a capacitive touch panel drive circuit can be reduced dramatically, by as much as about 80%. Such high efficiency touch panels have wide application to ultra-thin touch screens, including those suitable for use in mobile devices and flexible displays.

18 Claims, 11 Drawing Sheets

ARCHITECTURE AND DRIVING METHODS FOR MINIMIZING POWER LOSSES IN TOUCH PANEL

BACKGROUND

Technical Field

The present disclosure generally relates to low power touch screen technology for use in flexible displays.

Description of the Related Art

Many electronic devices such as smart phones, media players, gaming devices, tablet computers, and electronic kiosks are now equipped with a touch screen user interface. A touch screen typically includes a touch panel having touch sensors, a display, and a touch controller. Some touch controllers measure mutual capacitance between patterned layers on the touch surface. Some touch controllers measure self-capacitance between touch screen patterns and approaching objects. Capacitance between the touch screen and the underlying display surface is considered to be undesirable when sensing touch events. As touch screens become thinner, the capacitance values increase, and the power required to charge and discharge larger, undesirable, capacitors also increases. Meanwhile, it is desirable for touch screens to become more sensitive, and for their frequency of operation to increase so that signals can be transmitted at a faster rate. Both of these parameters—higher voltages for higher sensitivity and higher frequency for faster reporting rates—also require more power. Yet, many devices equipped with touch screens are mobile, battery-powered devices, for which lower power consumption is desirable.

In order to provide touch screens that are more capable but consume less power, efficiency of touch screen panels has become a current topic of interest. One way to improve efficiency of any electronic circuit is to reduce resistance associated with the various circuit components. However, in the case of touch screens, addressing resistance only shifts the problem from one part of the system to another. Indeed, the overall power needed to drive the capacitance is $P=CV^2f$, which power is dissipated in the driver itself and in the panel. It is possible to reduce power dissipation in the touch panel, but doing so will simply increase the power dissipation in the touch controller that drives the panel. Another technique for improving efficiency of touch screen panels in particular, called charge sharing, is described in U.S. Pat. No. 8,432,364. Charge sharing operates by recovering electric charge from a discharging capacitor to a charging capacitor. However, charge sharing may not be appropriate when concurrent scanning is used. Even with the benefit of charge sharing, a more drastic decrease in power consumption is still needed for advanced touch screen display technologies.

BRIEF SUMMARY

A method of improving efficiency of touch screens uses a multi-supply drive approach combined with an energy recovery method. The power required for capacitive driving can be reduced by adopting a multi-supply approach in which the touch panel has a multitude of different available voltage sources that can be successively used to charge and discharge a capacitor from an initial voltage to a final voltage. It can be demonstrated that the power required for such charging and discharging is less than the power required to directly charge the capacitor to the final voltage using a conventional approach with a single voltage source. Moreover, when such a multi-supply approach is combined with an energy recovery scheme, the overall efficiency of the system can be drastically enhanced.

In particular, a capacitive touch panel implemented with a concurrent drive scheme can be made more energy efficient using an energy recovery technique together with a multi-supply driving technique. Energy recovery operates by exchanging stored energy between a capacitor and an inductor. When both techniques are used together, power consumption circuits used to drive capacitive touch panels can be improved dramatically, by as much as about 80%. Such high efficiency touch panels have wide application to ultra-thin touch screens suitable for use in mobile devices and in flexible displays.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of semiconductor processing comprising embodiments of the subject matter disclosed herein have not been described in detail to avoid obscuring the descriptions of other aspects of the present disclosure.

Throughout the specification and claims that follow, the word "comprise" and variations thereof, such as "comprises" and "comprising" are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

Specific embodiments are described herein with reference to touch screens that have been produced; however, the present disclosure and the reference to certain materials, dimensions, and the details and ordering of processing steps are exemplary and should not be limited to those shown.

Figure 1A:
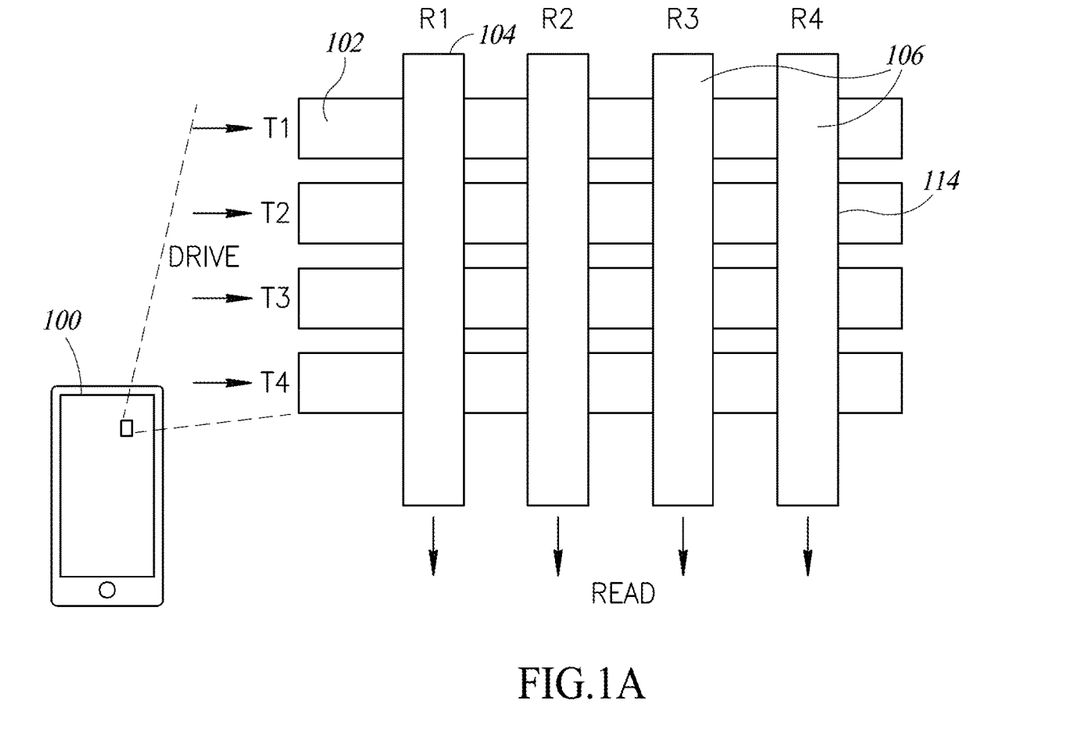
FIG. 1A is a schematic showing a top plan view of a capacitive touch screen having a simplified architecture including an array of four exemplary transmit lines and an array of four exemplary read lines, according to an embodiment as described herein.

FIG. 1A illustrates a portion of a capacitive touch panel display 100, according to an embodiment of the present disclosure. The capacitive touch panel display 100 is made of glass in which a matrix of transmit lines 102 and read lines 104 are formed as thin conductive wires embedded in the touch panel display 100. As an example, four transmit lines 102 are shown, oriented horizontally: T1, T2, T3, T4; and four read lines 104 are shown, oriented vertically: R1, R2, R3, and R4. In the full capacitive display panel 110, there will be several dozens or hundreds of such lines 102 and 104. The read lines 104 overlap the transmit lines 102 at junctions 106, forming parallel plate capacitors 114 in which the glass touch panel serves as the dielectric material separating the conductors.

Figure 1B:
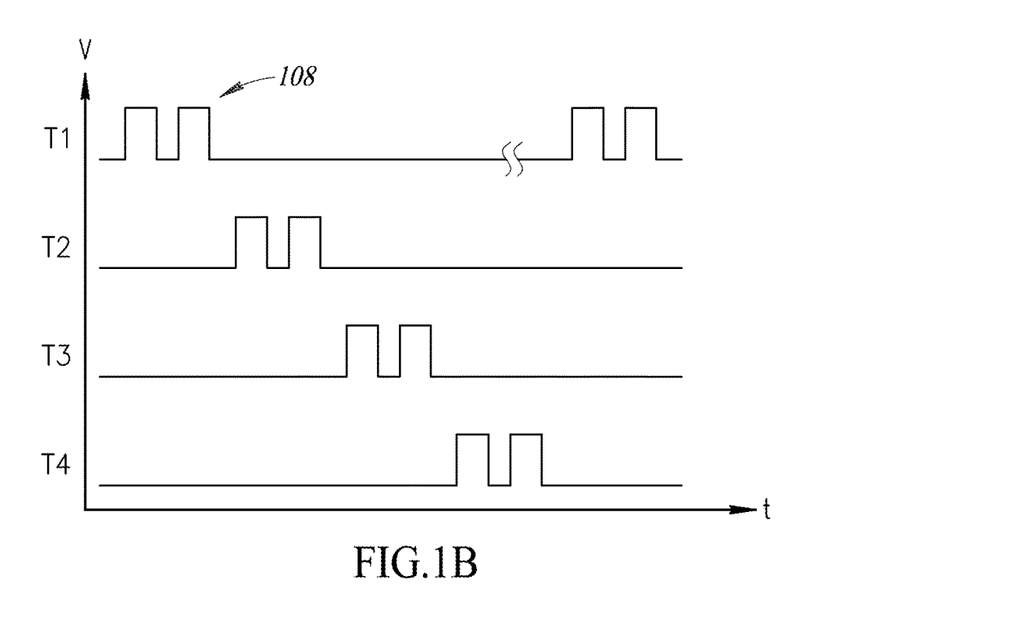
FIG. 1B is a timing diagram showing square wave drive signals applied to the four transmit lines shown in FIG. 1A.

A touch controller applies drive signals to the transmit lines, e.g., T1-T4, and reads signals from the read lines, e.g., R1-R4. FIG. 1B shows exemplary drive signals 108 applied to the transmit lines T1-T4 in the form of square waves.

Figure 2:
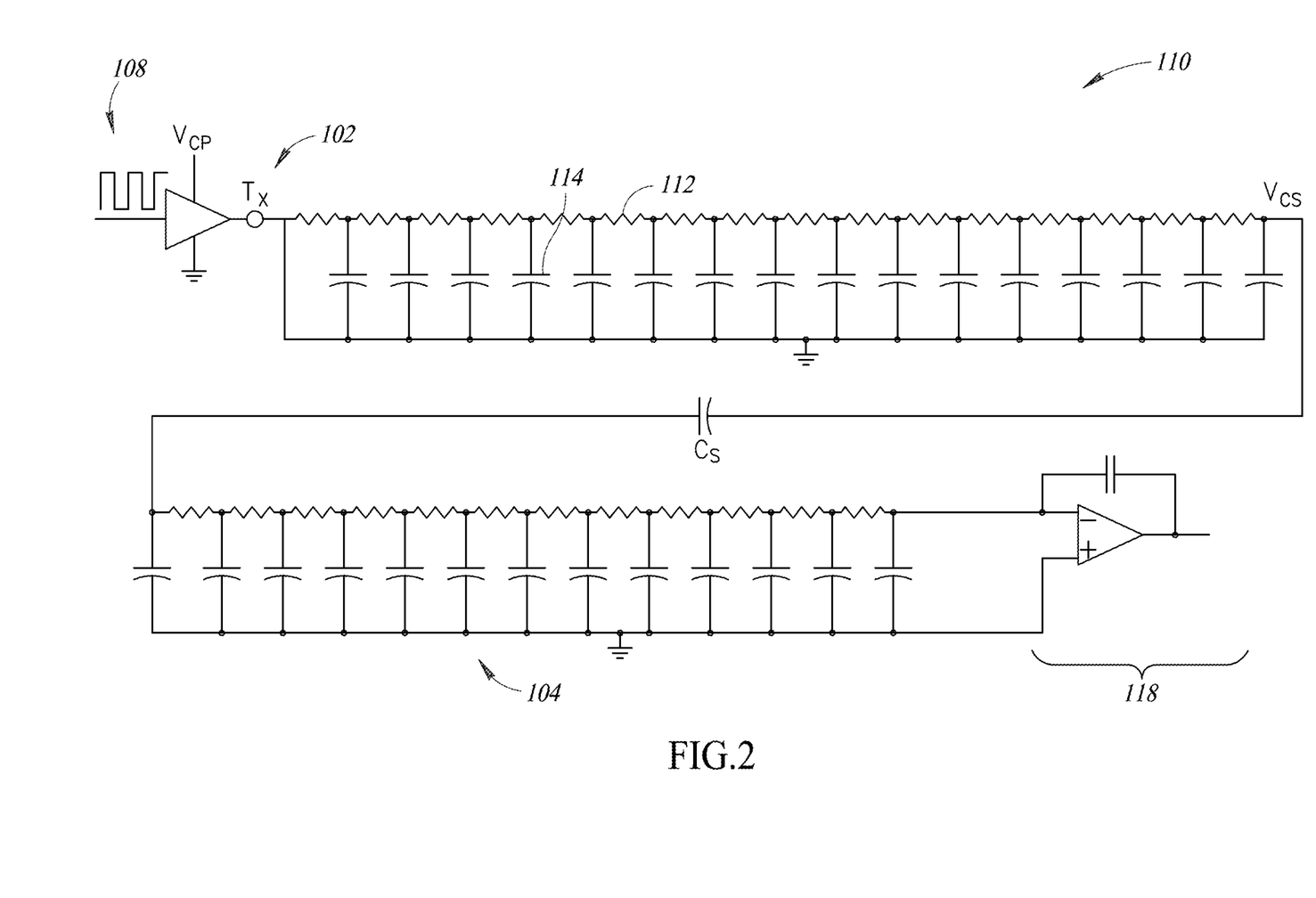
FIG. 2 is a circuit schematic representing an exemplary transmit line and an exemplary read line of a touch panel, according to an embodiment as described herein.

FIG. 2 shows an electric circuit model 110 of the touch panel display 100, according to an embodiment of the present disclosure. The circuit model 110 includes an exemplary transmit line 102 and an exemplary read line 104 separated by a series capacitance $C_s$ that corresponds to a capacitive junction. The circuit model 110 represents each of the transmit lines 102 and read lines 104 as a lumped RC network of resistors 112 and capacitors 114. Each transmit line 102 is driven using a conventional scheme having a standard output buffer 116 coupled to a main power supply $V_{CP}$. The output of each read line 104 is stored in an operational amplifier (op-amp) read line buffer 118. The transmit and read lines 102, 104 may be virtually grounded.

In a conventional touch panel display 100, the net capacitance C between the transmit line 102 and ground is typically in the range of about 40-80 picofarads (pF). A typical 12 Volt drive signal 108 applied to a transmit line 102 is in the form of a square wave having a frequency f of about 150 kHz. The power required to continuously drive such a conventional touch panel display 100 using the driving scheme shown in FIG. 1B and the electric circuit model 110 shown in FIG. 2 is given by $P=CV^2f$. The voltage V is derived from a low voltage supply using a conversion efficiency factor of 33%. For a standard 40 pF touch panel driven by a 3.3 V power supply with a current of 785 uA, the power calculated is 864 uW, or 0.864 mW.

In contrast, in a flexible touch panel display 100, the capacitance between the transmit line 102 and ground is about 350 pF and can be as high as 1 nF. Accordingly, the power, $P=CV^2f$, required to drive the flexible display touch panel is much larger—in the range of about 6.4 mW to 19 mW. Furthermore, as touch panels become thinner, the capacitance increases and the power required to drive the touch panel increases proportionally. In order to increase touch sensitivity, higher voltages are also used to achieve a larger signal-to-noise ratio (SNR). The SNR also improves at higher operating frequencies. All of these factors serve to increase the drive power $P=CV^2f$ that is needed for high performance applications.

Conventional techniques for driving and scanning touch panels use a sequential method in which the transmit lines are driven one at a time and the read lines are all read simultaneously. Alternatively, a concurrent method such as Code Division Multiple Access (CDMA) may be used in which the transmit lines are driven at the same time and the read lines are read at the same time. In such a concurrent method, all of the transmit lines may be driven at the same time that the read lines are scanned. As a consequence, concurrent methods consume more power. An alternative technique for driving a touch panel exists that permits reducing significantly the power required to drive an individual line. With such a technique, it is possible to drive multiple transmit lines with a reasonable demand for power. Under this scheme, charge and energy are exchanged between transmit lines and power supplies or, alternatively, among the drive lines themselves. Without applying any particular energy saving technique, the power consumed when driving four 350 pF lines concurrently using a 12 V power supply at a frequency of 150 kHz s calculated to be about 30 mW, according to $P=CV^2f$. Assuming 33% conversion efficiency from a low-voltage supply to a high-voltage supply, the power requirement translates to about 90 mW, which corresponds to 30 mA of current drawn on a 3V supply. The 30 mW estimate is taken as a reference number for use in comparisons in the following discussion.

Figure 3A:
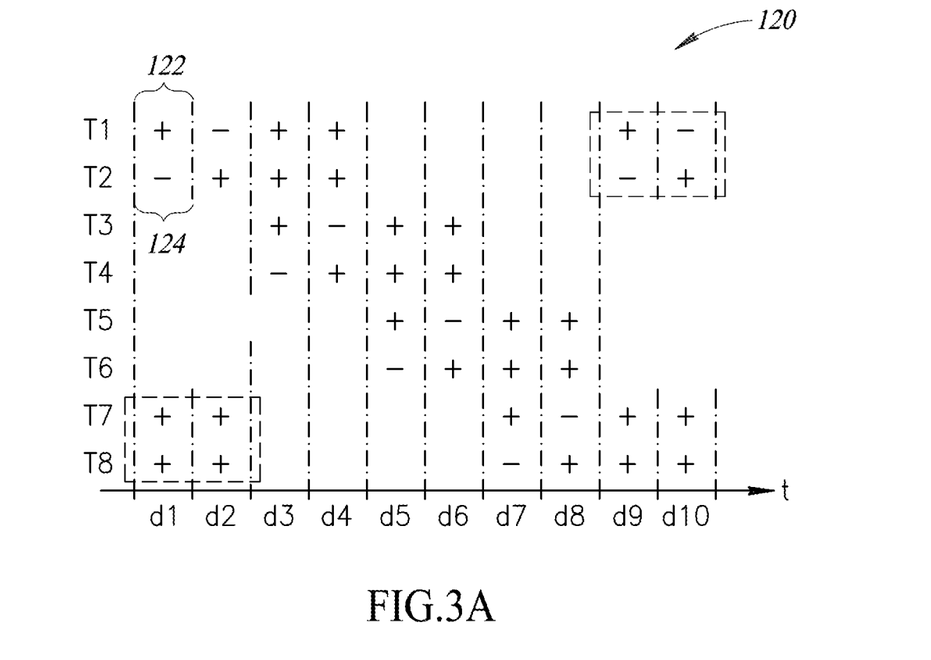
FIG. 3A is an illustration of eight transmit lines being driven during ten time intervals, according to a concurrent drive scheme according to an embodiment as described herein.
Figure 3B:
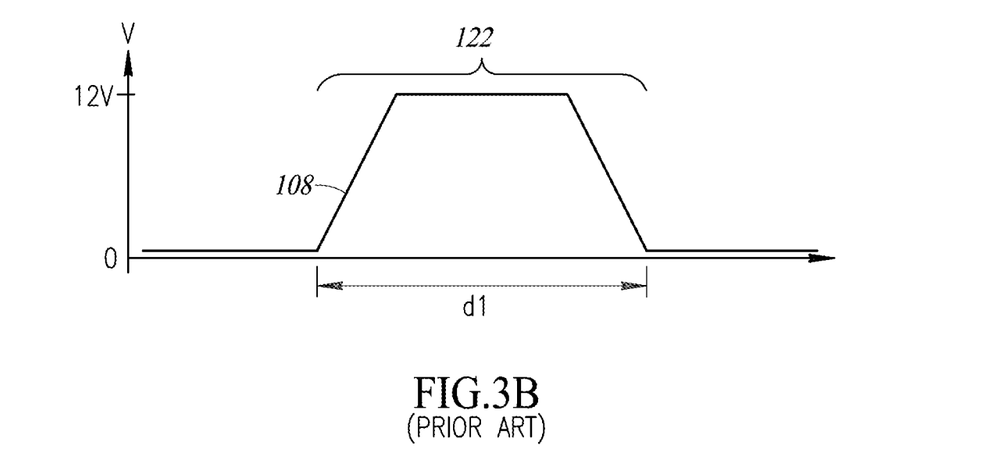
FIG. 3B is a timing diagram showing a drive signal voltage as a function of time for a touch panel circuit implemented with a conventional single power supply.

FIGS. 3A and 3B illustrate a concurrent drive scheme 120 that can be used to drive plurality of transmit lines 102, according to an embodiment of the present disclosure. FIG. 3A illustrates an example having eight drive lines, labeled as transmit lines T1-T8. Using the concurrent technique 120, four transmit lines T1, T2, T7, and T8 are driven during each of time slots d1 and d2; four transmit lines T1, T2, T3, T4 are driven during each of time slots d3 and d4, and so on. A "+" symbol denotes a full drive cycle 122 within which the drive signal 108 exhibits a rising transition followed by a falling transition, for example, during the time slot d1, as shown in the timing diagram of FIG. 3B. With reference to FIG. 2, during the drive cycle 122, the drive signal 108, powered by the supply $V_{CP}$, causes the voltage $V_{CS}$ on the load capacitor $C_S$ to transition from 0 V to 12 V and then back to 0 V. A "−" symbol describes a full drive cycle 124 within which a falling edge of the drive signal 108 precedes a rising edge.

During the time slot d1, the transmit lines T1, T7, and T8 all have the same symbols while T2 has the opposite symbol. Opposite square wave signal transitions during the same time interval d1 provide an opportunity for charge sharing. Charge sharing is a known technique that can save battery power needed to charge a capacitor by exchanging charge between a discharging capacitor and a charging capacitor.

FIGS. 4A-4D illustrate operation of capacitors $C_A$, $C_B$ using a conventional charge sharing circuit 130, according to the prior art. The charge sharing circuit 130 can be used to recycle charge and reduce the demand for power. Charge sharing is well known and has been used in many areas of electrical design, including low power digital CMOS circuits, LCD display drivers, and touch sensor panels, for example, as disclosed in U.S. Pat. No. 8,432,364. It is shown below that charge sharing can be used to reduce power consumption by 50% during each opposite + to − or − to + transition.

Figure 4A:
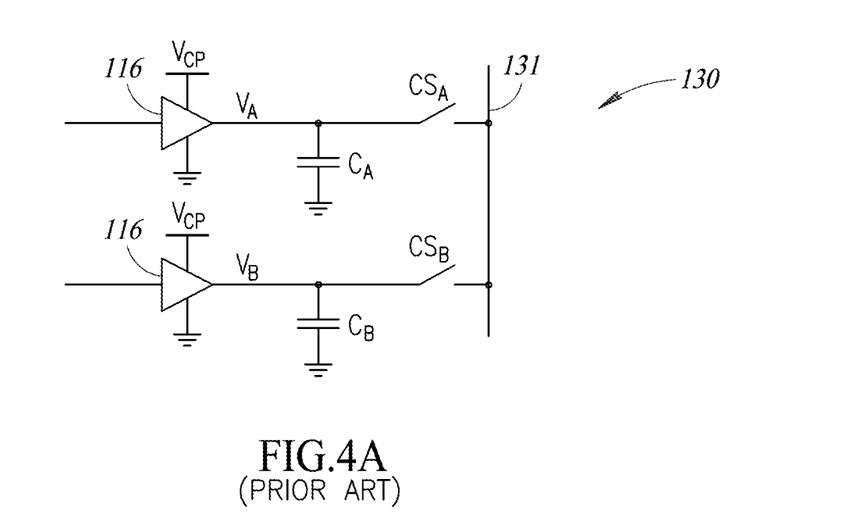
FIG. 4A is a schematic of touch panel circuitry implemented with a conventional method of charge sharing.
Figure 4B:
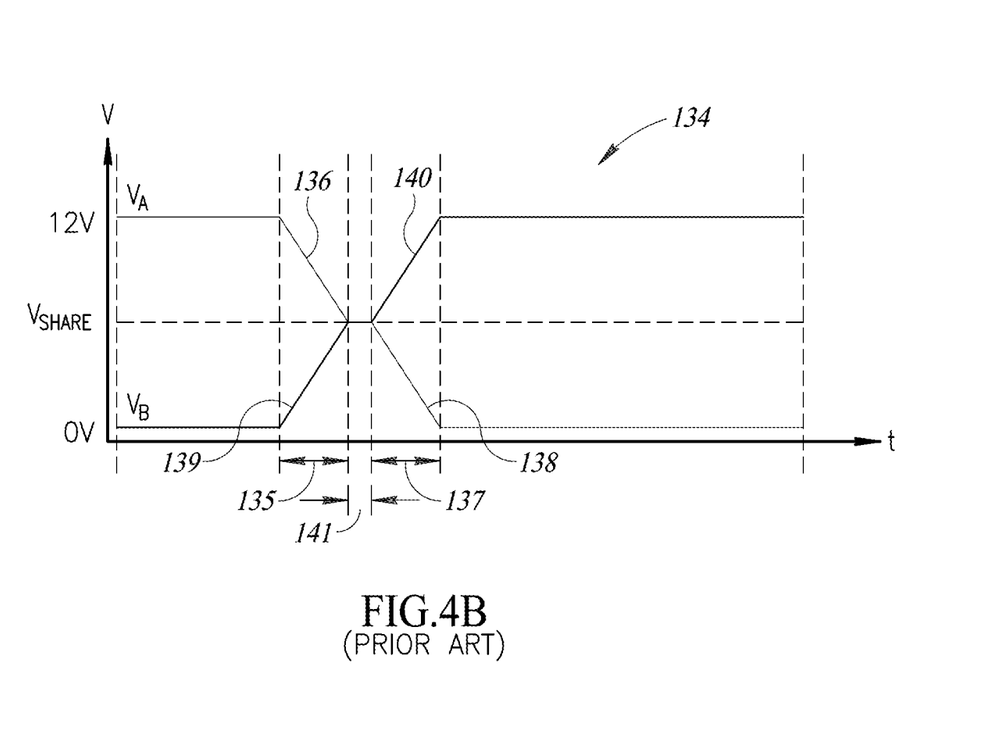
FIG. 4B is a timing diagram for the touch panel circuitry shown in FIG. 4A.

The charge sharing circuit 130 shown in FIG. 4A includes two buffers 116A and 116B, coupled to a charge sharing line 131 via capacitor switches $CS_A$ and $CS_B$, respectively. In the charge sharing circuit 130, the charge sharing line 131 couples output signals of two output buffers 116A, 116B to one another. The charge sharing line 131 then drives capacitors $C_A$ and $C_B$ according to the timing diagram 134 shown in FIG. 4B. $C_A$ and $C_B$ are assumed to have substantially equal capacitance values. FIG. 4B shows a plot of voltage $V_A$ on the capacitor $C_A$ at selected time intervals as the capacitor $C_A$ discharges during a high-to-low transition. $V_A$ decreases from 12 V to 6 V during a time interval 135 in a first step 136, and then decreases from 6 V to 0 V during a time interval 137 in a second step 138. FIG. 4B also shows a plot of voltage $V_B$ on the capacitor $C_B$ at selected time intervals, during a low-to-high transition. $V_B$ increases from 0 V to 6 V in a first step 139, during the time interval 135, and then increases from 6 V to 12 V in a second step 140, during the time interval 137. Charge sharing between the capacitors $C_A$ and $C_B$ occurs during a brief time interval 141 at the transition between the first and second steps. During the charge sharing period, charge from the capacitor $C_A$ is transferred to the capacitor $C_B$ via the charge sharing line 131.

Figure 4C:
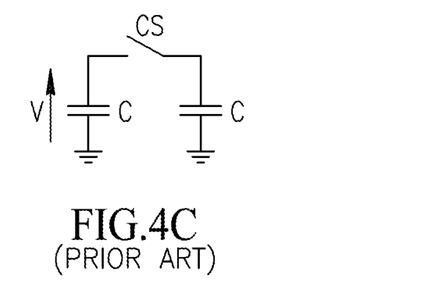
FIGS. 4C and 4D are electric circuit schematics illustrating operation of the conventional charge sharing circuit shown in FIG. 4A.
Figure 4D:
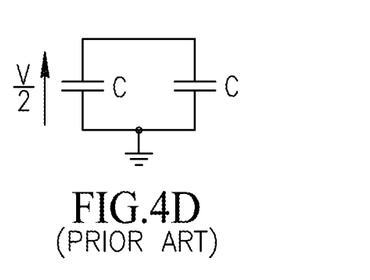

Although the conventional charge sharing scheme described above can result in as much as 50% energy saving, reaching 50% assumes that the capacitances of each line are equal and the numbers of positive and negative symbols in the driving scheme 120 are equal. To illustrate this, FIGS. 4C and 4D show a simplified charge sharing circuit having two equivalent capacitors C. In FIG. 4C, prior to charge sharing, a switch $C_s$ coupling the two capacitors is open so that one capacitor is charged to a voltage V while the other capacitor is discharged. The energy of the charged capacitor is E=½ $CV^2$, while the energy stored in the discharged capacitor is zero. In FIG. 4D, the switch $C_s$ coupling the two capacitors is closed and the charge is shared so that each capacitor is charged to a voltage V/2. The energy stored in each capacitor is then E=½ $C(V/2)^2$=⅛ $CV^2$, and the total energy is ¼ $CV^2$, that is, the final energy is 50% of the original total energy. Because half the total energy remains after charge sharing, the efficiency of this charge sharing scheme is only 50%.

When using advanced concurrent drive methods in which dynamically changing patterns having unbalanced +/− transitions are common, such transitions provide an opportunity to implement a new dual supply energy saving method as an alternative to conventional charge sharing. In the dual supply method, energy is recovered and stored in a second power supply either directly, or by using additional inductive devices. The dual supply method allows energy savings to exceed the 50% limit that exists with the conventional charge sharing process described above.

Figure 5A:
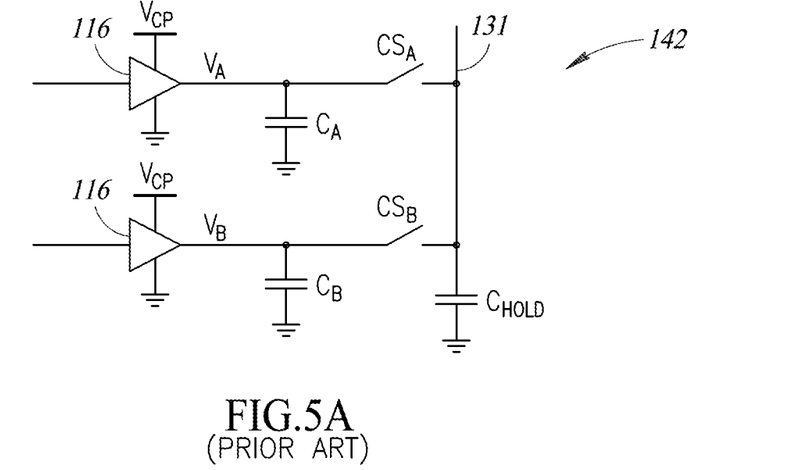
FIG. 5A is a schematic of touch panel circuitry implemented with a conventional driving scheme having a single holding capacitor.
Figure 5B:
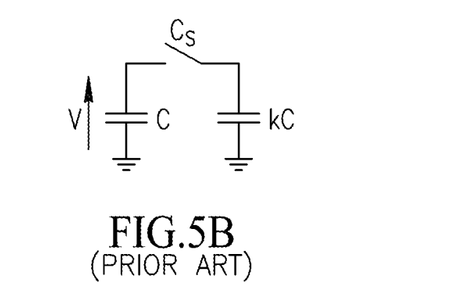
FIGS. 5B and 5C are circuit schematics illustrating operation of the touch panel circuitry shown in FIG. 5A.
Figure 5C:
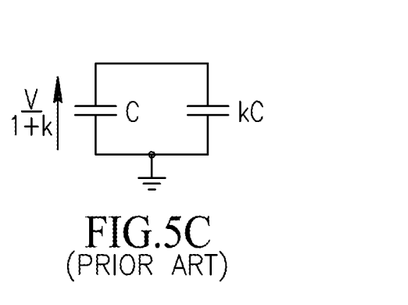

FIG. 5A illustrates a modified charge sharing circuit 142, known in the art, which includes a holding capacitor. It is possible for the resulting modified charge sharing circuit 142 to reach 50% efficiency when the holding capacitor $C_{hold}$ is already pre-charged to an optimum voltage level. FIGS. 5B and 5C illustrate that the efficiency of the modified charge sharing circuit 142 is lower whenever the holding capacitance is not yet charged to the optimum voltage level.

FIGS. 5B and 5C illustrate operation of the modified charge sharing circuit 142. A simplified version of the modified charge sharing circuit 142 includes a capacitor C and a holding capacitor kC. In FIG. 5B, prior to charge sharing, the switch $C_s$ coupling the two capacitors is open so that the capacitor C is charged to a voltage V while the capacitor kC is discharged. The energy of the charged capacitor is E=½ $CV^2$, while the energy stored in the capacitor kC is zero. In FIG. 5C, the switch $C_s$ coupling the two capacitors is closed and the charge is shared so that each capacitor is charged to a voltage V/(1+k). The total energy stored in both capacitors is then E=1/(1+k) ½ $CV^2$. Thus, the final energy is 1/(1+k) times the initial energy, which means that when k=1, the efficiency is 50%, but when k>1, the efficiency is less than 50%.

Figure 6A:
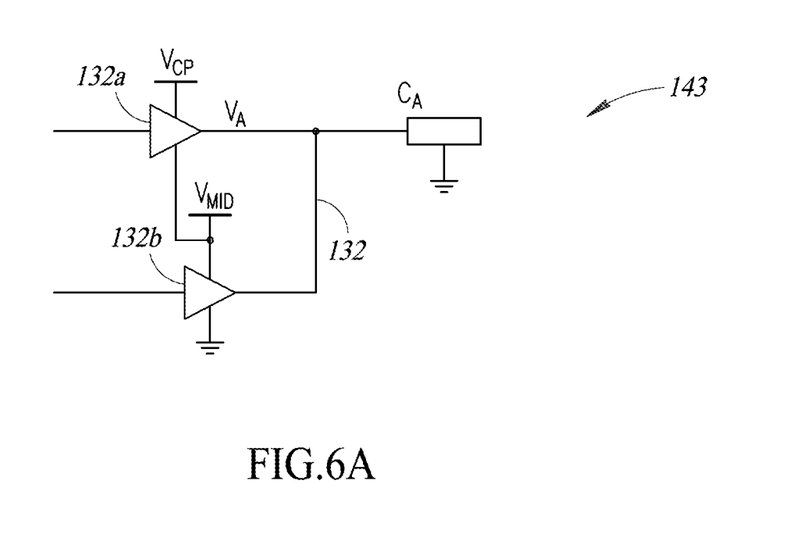
FIG. 6A is a schematic of touch panel circuitry implemented with a dual-voltage driving scheme, according to an embodiment as described herein.

FIG. 6A shows dual supply drive circuit 143 associated with an energy recovery process, according to an embodiment of the present disclosure. In the dual-supply drive circuit 143 the capacitor $C_A$ is driven by two output buffers 132a,b which have capabilities to offer tri-state output. The output buffers 132a,b are supplied by the main power supply $V_{Cp}$ and an intermediate voltage power supply $V_{mid1}$, respectively. The main power supply $V_{Cp}$ supplies a voltage V. The intermediate voltage power supply $V_{mid1}$ supplies a voltage approximately equal to V/2. Using such a bi-supply structure the capacitor charging/discharging process can be performed by the two power supplies together.

Figure 6B:
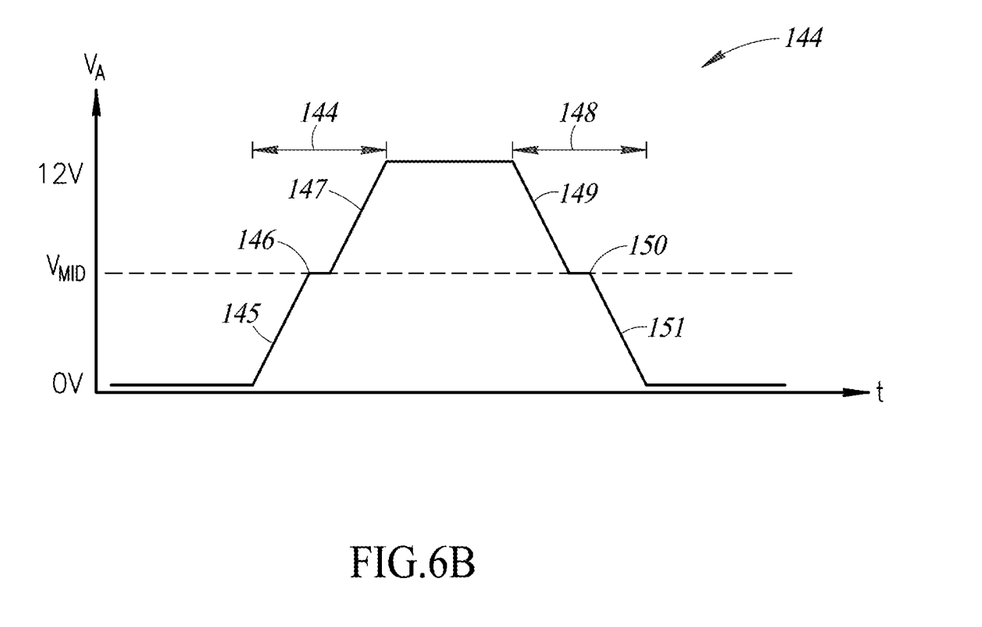
FIG. 6B is a timing diagram for the touch panel circuitry shown in FIG. 6A.

FIG. 6B shows a timing diagram 144 for operating the dual supply drive circuit 143. The timing diagram 144 is a plot of the voltage $V_A$ on the capacitor $C_A$ at selected time intervals, as the capacitor $C_A$ charges from 0V to 12V during a low-to-high transition. As is known in the art, the power required to charge a capacitance C to a voltage V at a frequency f is P=$CV^2$f. The corresponding charge stored on a capacitor C is given by Q=CV, and the average current is given by I=Q/t=CVf.

The power budget during operation of the dual supply drive circuit 143 in particular, can be understood as follows:

During a charging time interval 144, $V_A$ increases from 0 V to 6 V in a first step 145 and then remains flat in a second step 146 before increasing to 12 V in a third step 147. During the first step 145, some energy is provided by the power supply $V_{mid}$ to charge the capacitor $C_A$. The charge provided is $Q_1$=CV/2 and the average current is $I_1$=$Q_1$/t=½CVf for an associated power $P_1=\frac{1}{4}CV^2f$ provided by $V_{mid}$ over a full cycle. During the third step 147, the power provided by the main power supply $V_{cp}$ to charge the capacitor $C_A$ from V/2 to V is $P_2=\frac{1}{2}CV^2f$, the current is $I_2=Q_2/t=\frac{1}{2}CVf$.

During a discharging time interval 148, $V_A$ decreases from 12 V to 6 V in a first step 149, and then remains flat in a second step 150 before decreasing to 0 V in a third step 151. During the first step 149, some charge is drained from the capacitor $C_A$, causing the voltage $V_A$ to decrease from $V_{cp}$ to $V_{mid}$, while an average current equal to $I_3=-Q_3/t=-\frac{1}{2}CVf$ enters the $V_{mid}$ supply. The power restored to $V_{mid}$ is therefore $P_3=-\frac{1}{4}CV^2f$, balancing the power $P_1$ consumed in the step 145. In the third step 151, the capacitor $C_A$ is fully discharged to ground so that $V_A=0$. The overall power dissipation is therefore $P=\frac{1}{2}CV^2f$, which is only 50% of the power that would otherwise have been required if a single power supply $V_{cp}$ were used.

It is noted that, during steps 145 and 151, the output buffer 132b is engaged, while during steps 147 and 149, the output buffer 132a is engaged. Steps 146 and 150 are used as safety intervals during which the output buffers 132a,b are not engaged simultaneously.

Figure 7A:
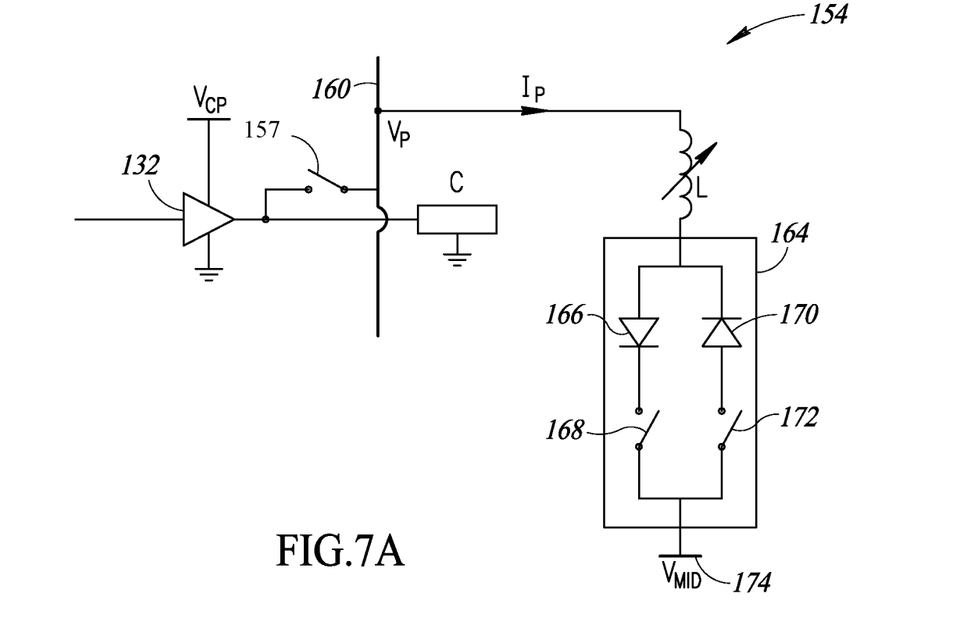
FIG. 7A is a schematic of touch panel circuitry implemented with dual supply and energy recovery, according to an embodiment as described herein.
Figure 7B:
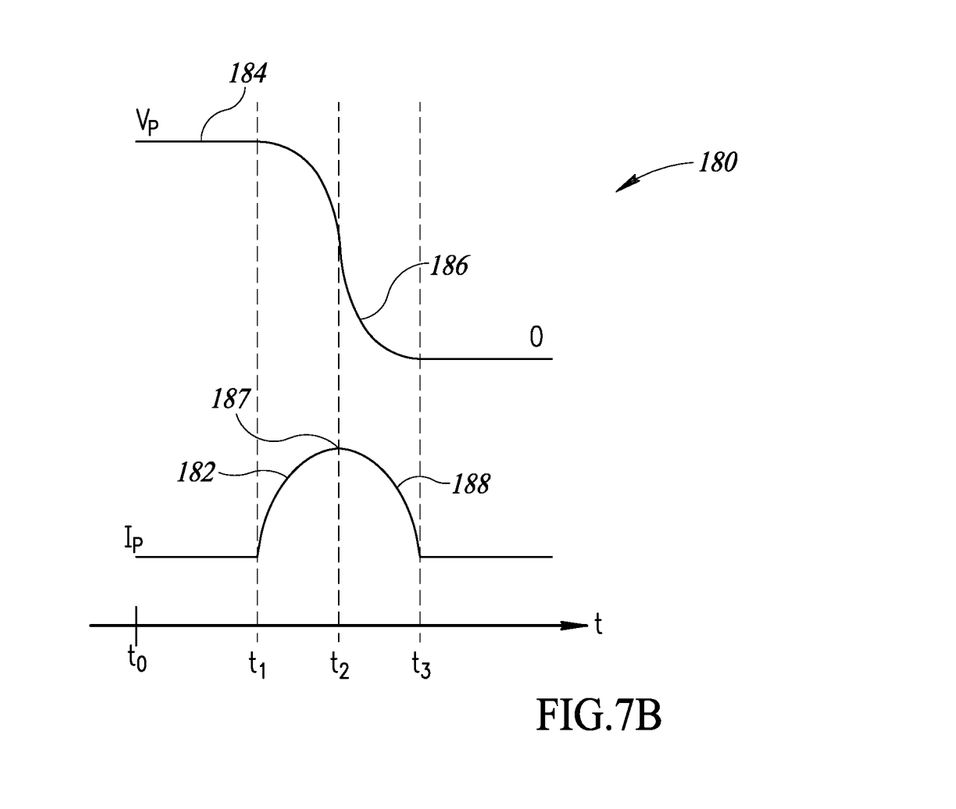
FIG. 7B is a graph of voltage and current as a function of time, for the touch panel circuit shown in FIG. 7A.

FIGS. 7A,7B illustrate another energy saving technique referred to as energy recovery, according to an embodiment of the present disclosure. Using the principle of energy recovery, energy is transferred among storage elements in a circuit via a non-dissipative path. A non-dissipative path can be realized by substituting an inductor 162 having inductance L, for a resistive load. The resulting L-C oscillator preserves energy in the inductor, so it can be restored to the capacitor with substantially no energy loss. Using energy recovery, it is theoretically possible to recover 100% of the energy stored in the capacitor each time the capacitor discharges. Accordingly, the term "recovery" is used herein to indicate a substantially full energy recovery, as opposed to other techniques in which charge is transferred among capacitors and power supplies along a dissipative path that converts some of the energy into heat, thereby incurring significant energy losses. Energy recovery can be used separately from charge sharing, or in conjunction with charge sharing, with the consideration that a tradeoff exists between energy savings and circuit complexity.

FIG. 7A illustrates the principle of energy recovery with reference to an idealized energy recovery circuit 154, according to an embodiment of the present disclosure. The energy recovery circuit 154 can be used to recover energy from the capacitor C during a + to + transition. In the energy recovery circuit 154, a three-state output buffer 132 is coupled via a switch 157 to an energy recovery rail 160. The three states of the output buffer 132 are high, low, and open. The energy recovery rail 160 drives an inductor L according to a timing diagram 180 shown in FIG. 7B. The capacitor C represents the lumped capacitance $C_s$ of a touch screen that characterizes the RC network shown in FIG. 2. The inductor L is coupled to a compound switch 164. The switch 157 engages the inductor L and the compound switch 164. The compound switch 164 includes a first diode 166 and a first diode switch 168 coupled in parallel to a second diode 170 and a second diode switch 172. The compound switch 164 is represented by diodes to provide an easy illustration of the direction on the current flowing during operation. However, the invention is not limited to this example. Other implementations using, for example, synchronously controlled switches can be more efficient in terms of power saving.

The energy recovery circuit 154 generally operates as follows: prior to time $t_0$, the switch 157 connecting the drive line to the energy recovery rail 160 is open, and the capacitor C is charged through the output buffer 132. When energy recovery is desired, the switches 157 and 168 are closed and the buffer output is put in tri-state, causing the energy recovery circuit 154 to become an LC oscillator circuit. As the capacitor C discharges, energy leaving the capacitor C is temporarily stored in the magnetic field of the inductor L while the charge on the capacitor C is transferred to the supply $V_{mid}$ at node 174. Gradually, the current $I_p$ in the inductor L rises, reaching a maximum and then begins to decrease while there is a progressive transfer of the charge from the capacitor C to the supply $V_{mid}$, via the inductor L. The number of windings on the inductor 162 and its ohmic resistance are factors that affect the amount of energy that can be captured and stored by the inductor L. In operation, a 0.6 mm thick CMS induction coil having an inductance value of 2.2 µH has been used as the inductor L to recover 70%-80% of the energy discharged from the capacitor C. An induction coil having a larger inductance could be used to store more energy. However, it would be more desirable to reduce the size of the inductor 162 to a 0.4 mm thick CMS coil, to save space and achieve a faster response time, instead of increasing the size of the inductor L. The inductor L therefore can adopt different values depending on trade-off between available area and desired performance. For example, the inductor L can be a variable inductor having a plurality of taps and the particular tap that is selected can be based on the inductance value that is desired for a particular operation.

FIG. 7B shows plots of voltage and current over time during a capacitor discharge event using the energy recovery circuit 154 as described above. Initially at time $t_0$, the voltage on the capacitor is at a maximum value $V_p$. The time interval from $t_1$ to $t_3$ represents a high-to-low transition. At time $t_1$, the switch 157 is closed and the first diode switch 168 is closed to complete the LC circuit and begin discharging the capacitor C. As the capacitor C discharges, the current flowing in the energy recovery circuit 154 begins to rise, as shown by the curve 182, while the voltage, $V_p$, on the capacitor C falls as shown by the curve 184. At time $t_2$, when the maximum current $I_p$ has been reached. the voltage $V_p$ continues falling to zero, as shown by the curve 186, while the current starts to decrease after having reached its maximum value. At t3, the energy in the inductor is back to zero and the full amount of charge of the capacitor C has been transferred to supply 174. Because the capacitor C is fully discharged, current stops flowing in the energy recovery circuit 154. Similarly, during a – to + transition, switch 172 would be activated and the capacitor C would charge from 0 to 12 V taking its energy from $V_{mid}$. Therefore the energy restored from the capacitor C to the supply $V_{mid}$ during a + to – transition is eventually re-used to supply energy from $V_{mid}$ to the capacitance C during a – to + transition. In one example, C=700 pF; L=2.2 µH; the time interval $t_1$ to $t_3$=123 ns; and the current $I_p=\sqrt{LC}\cdot V_p/2=107$ mA.

Energy recovery in a real system will not be 100% because of parasitic resistances along the current path, such as resistance associated with the diodes and switches, the inductor, and so forth. The parasitic resistances and the resistance of the touch panel display 100 can be lumped into a single resistance value R, which will damp oscillation of the LC circuit in accordance with a damping ratio:

$$\zeta = R/2 \sqrt{C/L}. \tag{1}$$

In equation 1, the damping ratio zeta ($\zeta$) is a function of the lumped parasitic resistance R, the capacitance C and the inductance L.

Figure 8A:
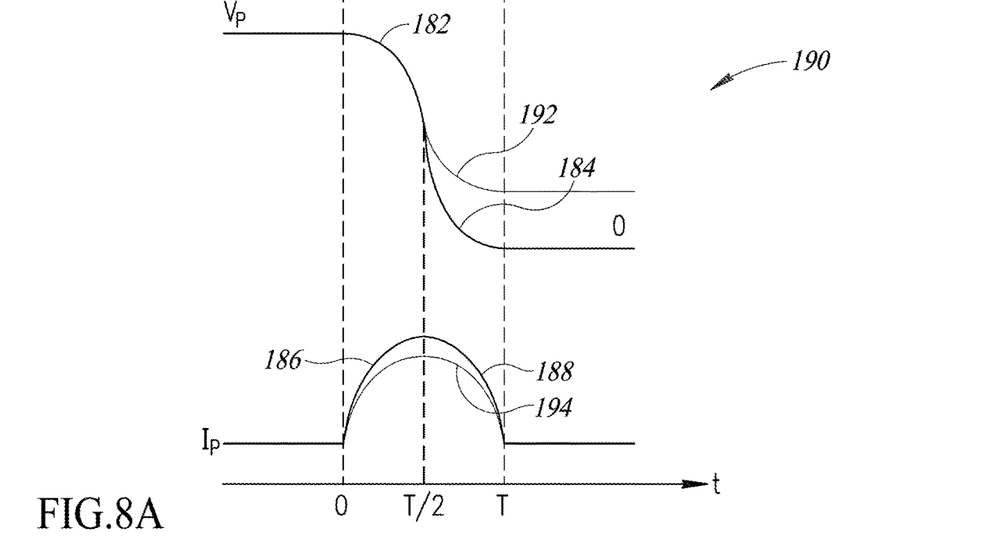
FIG. 8A is a graph of voltage and current as a function of time for the circuit shown in FIGS. 5A, 5B, taking into account parasitic resistances along the current path, according to an embodiment as described herein.
Figure 8B:
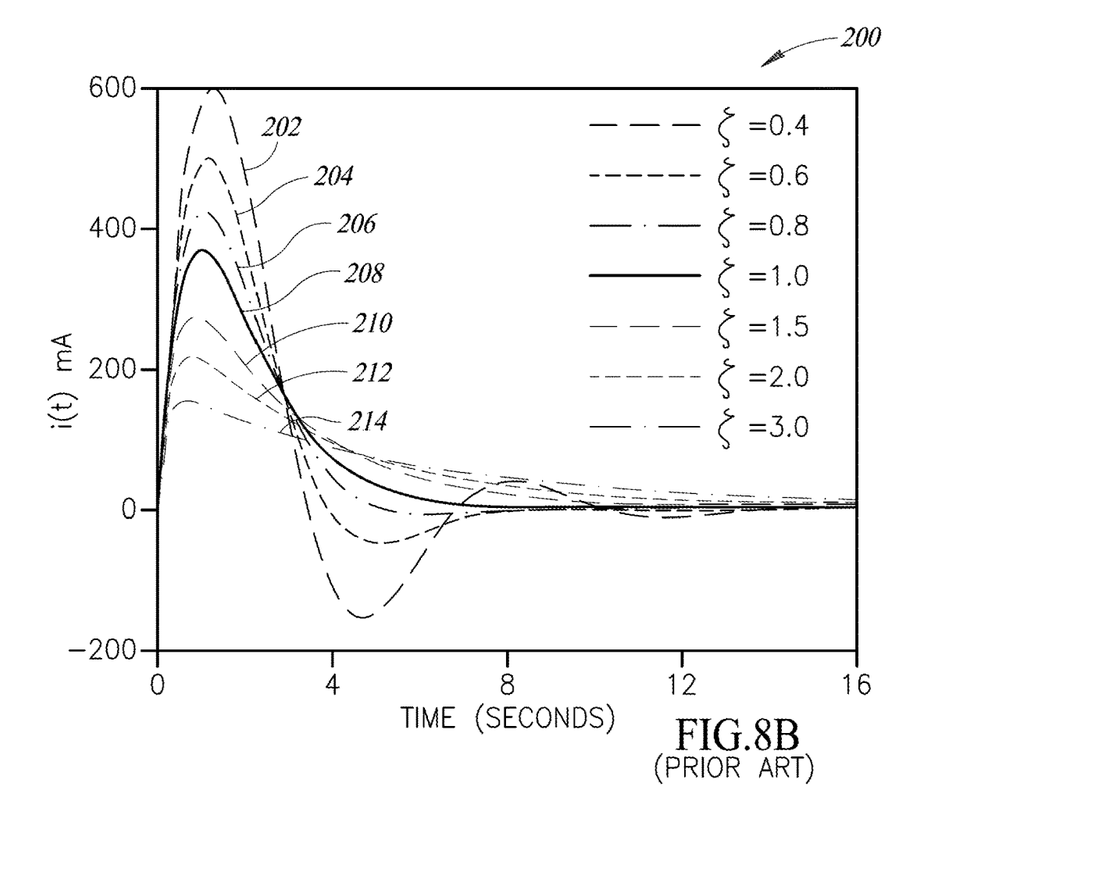
FIG. 8B is a reference graph showing current flowing through a conventional R-L-C damped network during resonance.

FIGS. 8A and 8B illustrate operation of the energy recovery circuit 154, taking into account such parasitic resistances. FIG. 8A shows a timing diagram 190 in which the voltage $V_p$ begins decreasing along the curve 182, but decreases only to a non-zero final voltage value 192, while the current $I_p$ rises only to a maximum current value according to the curve 194, which is below the ideal maximum current value 187 shown in FIG. 7B. FIG. 8B shows a plot of current as a function of time during several oscillatory cycles, for different values 202, 204, 206, 208, 210, 212, and 214 of the damping ratio ζ ranging from 0.4 to 3.0, respectively, to show under-damped and over-damped response of the RLC circuit. In the example shown, the lumped resistance R=135Ω; the total time interval $t_3-t_1$=123 ns; the maximum value of $I_p$=107 mA, and the damping ratio ζ=1.2. Increasing L to 10 pH reduces the damping ratio ζ to 0.24. The energy recovery method is superior to the conventional charge sharing method as long as the damping ratio is significantly less than 1.

Figure 9:
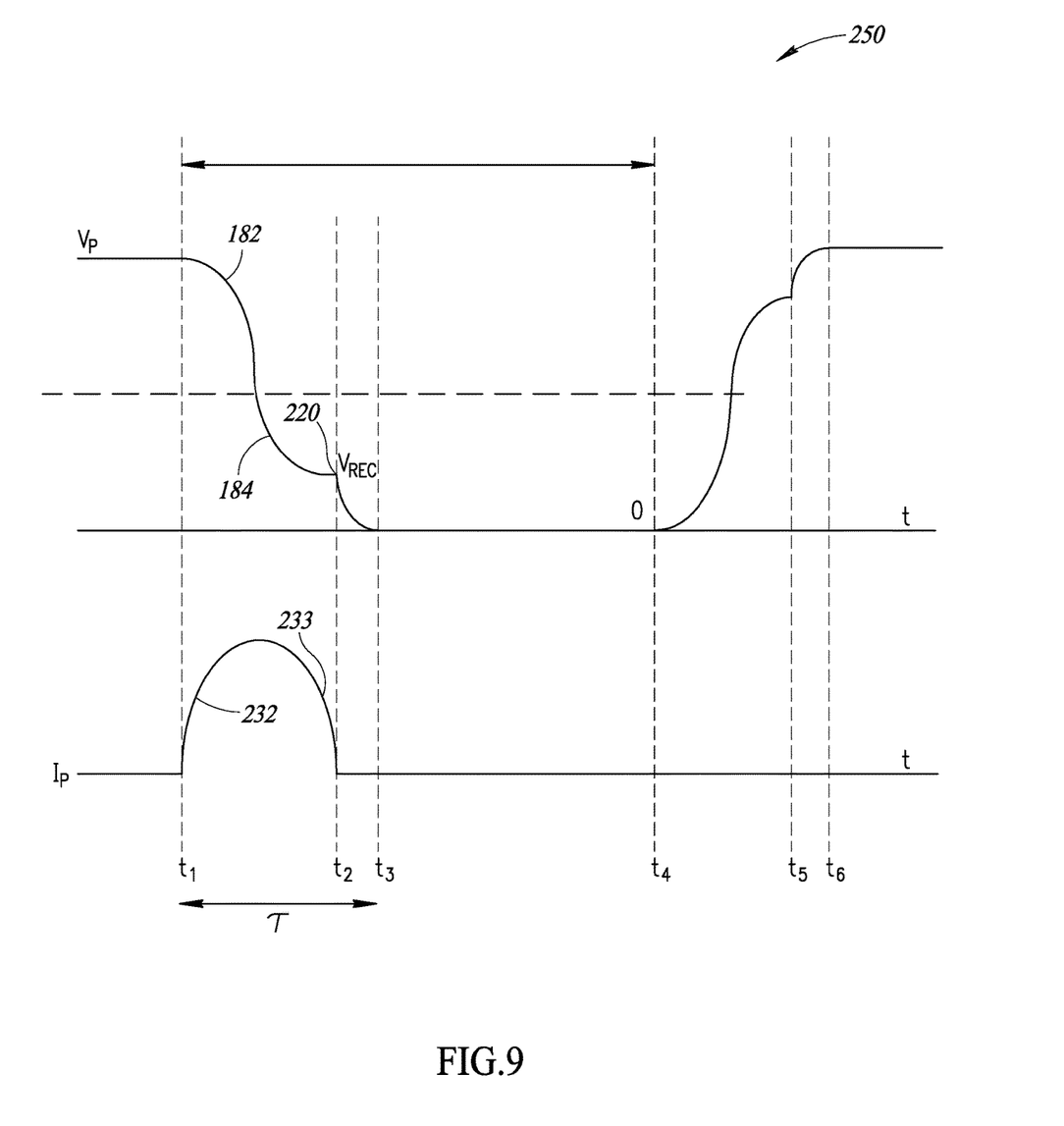
FIG. 9 is a plot of voltage and current as a function of time for a circuit implemented with energy recovery, according to an embodiment as described herein.

FIG. 9 illustrates that energy harvested using energy recovery can exceed the energy harvested using conventional charge sharing. FIG. 9 shows a timing diagram 250 for the energy recovery circuit 154 under non-ideal conditions, but in which energy recovery exceeds 50% during both a + to − transition from $t_1$ to $t_3$, and a − to + transition from $t_4$ to $t_6$. The plots shown in FIG. 9 during the overall time interval from $t_1$ to $t_6$, represents a full + to + transition. Initially at time $t_0$, the capacitor C is fully charged via the output buffer 132 so that the voltage on the capacitor is at a maximum value $V_p$. At time $t_1$, the switch 157 is opened, the output buffer 132 is put in tri-state mode and the first diode switch 168 is closed to complete the LC circuit and begin discharging the capacitor C. As the capacitor C discharges, the current flowing in the energy recovery circuit 154 begins to rise, as shown by the curve 232, while the voltage, $V_p$, on the capacitor C falls as shown by the curve 182. When the maximum current $I_p$ has been reached, the voltage inverts across the inductor L. The voltage $V_P$ continues falling, as shown by the curve 184, while the current starts to decrease as shown by the curve 233, as the discharging process slows. At time $t_2$, the voltage $V_p$ begins to level off at a non-zero value, $V_{rec}$, shown as point 220 on the graph in FIG. 9.

At time $t_2$, energy recovery is complete, and the transmit line 102 must be driven to reach the desired zero value at time $t_3$. To do this, the line 102 is pulled to ground by means of the output buffer 132. The energy recovery has extended the cycle time by about 20% for a total cycle time $\tau=\pi\sqrt{LC}$. However, the voltage recorded when oscillation ends, $V_{rec}$, is less than $V_P/2$, which means that more than 50% of the energy has been recovered. The driving signal is only applied for a short time interval between $t_2$ and $t_3$. The next steps re-use the energy harvested during the + to − transition so as to perform the − to + transition. At time t4, the output buffer 132 is still holding the capacitance C at ground. At time t1, the output buffer 132 is put into tri-state mode, and switches 157 and 172 are closed. In response, current starts to flow from the supply 174, $V_{mid}$, to capacitance C via the diode 170 and the inductor L. During the phase t4-t5, the voltage will rise and reach a $V_{REC}$ value that exceeds $V_p/2$, while during this time current in the inductor L will reach a maximum value.

Figure 10:
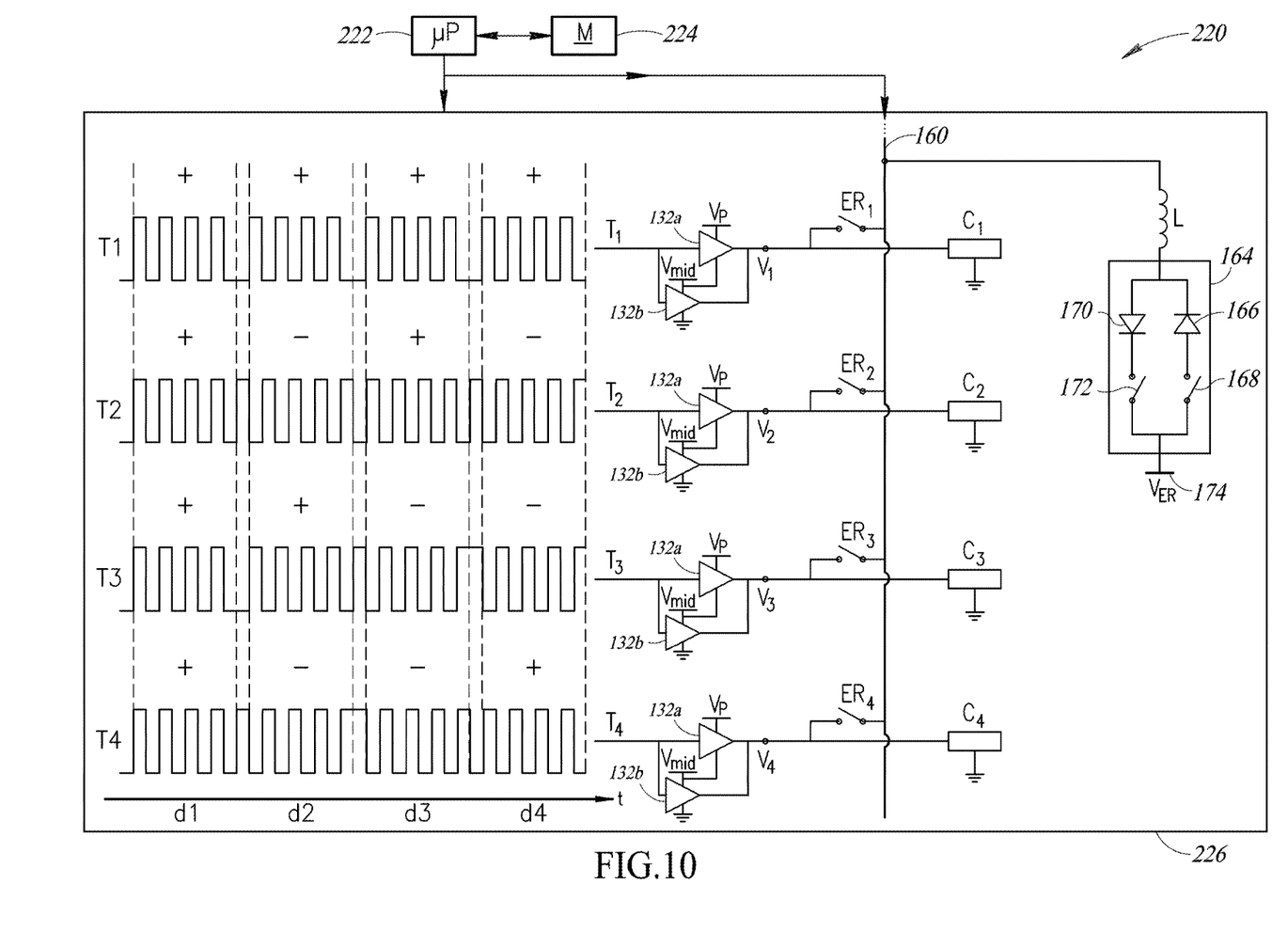
FIG. 10 is a schematic circuit diagram showing four representative output buffers of a touch panel, in which both a dual-supply driving technique and energy recovery are used, according to an embodiment as described herein.

FIG. 10 illustrates a basic low power drive circuit implementation 220, according to an embodiment of the present disclosure. It is noted that any of the methods described herein for operating touch panels, including driving transmit lines and reading read lines, can be computer-implemented by a microprocessor 222. The microprocessor 222 may be a CPU or a special purpose processor such as a signal processor. Accordingly, the drive signals and associated electrical connections and signal timing thereof can be determined according to microprocessor-implemented instructions stored in a computer-readable memory 224. Furthermore, microprocessor-implemented instructions can be used to generate control signals and to activate electrical switches in the various circuits of a touch controller 226. The microprocessor 222, the memory 224 may be part of a system-on-chip (SOC). The touch controller 226 is typically provided as part of the display.

Drive signals T1-T4 as shown in FIG. 10 are coupled to corresponding transmit lines of the touch controller 226. In the low power drive circuit implementation 220, both a dual-supply drive and energy recovery can be selectively applied to the drive signals. Four representative channels, transmit lines T1-T4, are shown. It is desirable to implement both dual-supply drive and energy recovery to reduce power consumption associated with a concurrent driving and scanning technique. Each of the transmit lines T1-T4 is coupled to the common energy recovery rail 160 by switches $ER_X$ as shown in FIG. 7A, via buffers 132a,b, as shown in FIG. 6A. The buffers 132a,b may be three-state output buffers supplied by power supplies $V_p$ and $V_{mid}$. The transmit lines T1-T4 are then coupled to respective capacitors C1-C4. While only one energy recovery rail 160 and one inductor L are shown in FIG. 10, it may be desirable to implement energy recovery with two or more energy recovery rails 160 coupled to two or more inductors 162. Multiple energy recovery rails 160 can be distinct in one mode, or merged in another mode.

FIGS. 11A-11E show plots of drive voltages as a function of time for a computer model of the four transmit lines T1, T2, T3, and T4 in the circuit shown in FIG. 10, under various simulated drive conditions. Each curve represents the voltage for a particular transmit line during a first transition − to + or + to − during a time interval d1, and a second, opposite transition + to − or − to + during a time interval d2. Taken together, the two time intervals d1 and d2 represent a transition from − to − or + to +.

Figure 11A:
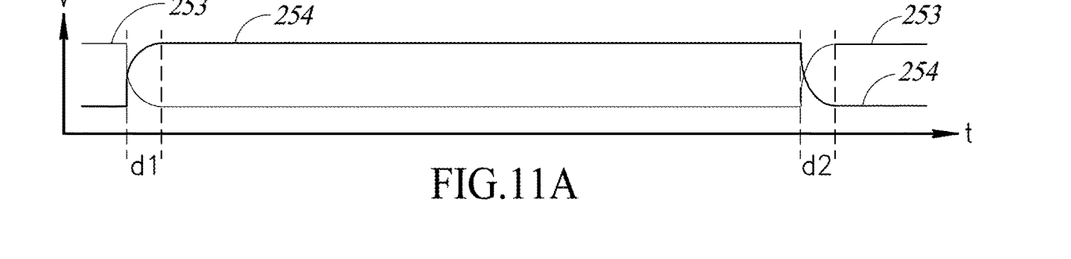
FIGS. 11A-11E is a series of voltage plots comparing switching operations of various drive circuits as described herein.

FIG. 11A shows a plot of drive voltage on the touch panel under normal drive conditions, without the benefit of dual-drive or energy recovery. During an initial time interval d1, the curve 253 represents a transition from + to − and the curve 254 represents a transition from − to +. During a subsequent time interval d2, the curve 253 represents a transition from − to + and the curve 254 represents a transition from + to −. To complete such transitions, the transmit lines are simply driven high or low by their respective buffers that are supplied with a single power supply. Under normal drive conditions in the example of FIG. 11A, the power consumed is the highest, at about 30 mW.

Figure 11B:
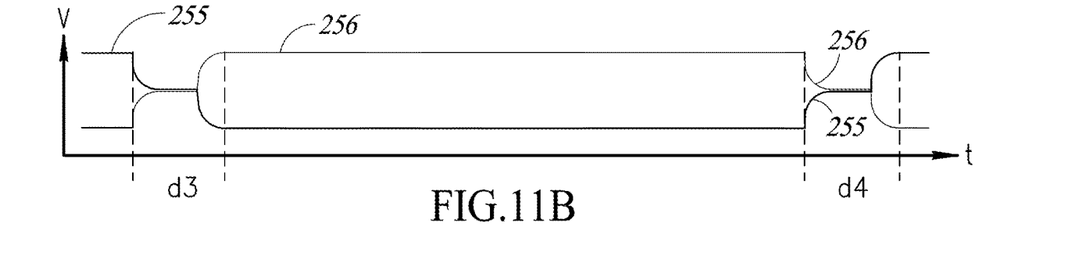

FIG. 11B shows a plot of voltage using a dual-supply drive only, wherein the energy recovery rail 160 is disengaged by holding open the switches $ER_X$. During an initial time interval d3, the curve 255 represents a transition from + to − and the curve 256 represents a transition from − to +, in which two power supplies are successively used within a sharing time interval d3 for four capacitors. During a subsequent time interval d4, the curve 255 represents a transition from − to + and the curve 256 represents a transition from + to −. In the example of FIG. 11B, when four outputs are driven using the dual-supply drive only, the power consumed is about 15 mW.

Figure 11C:
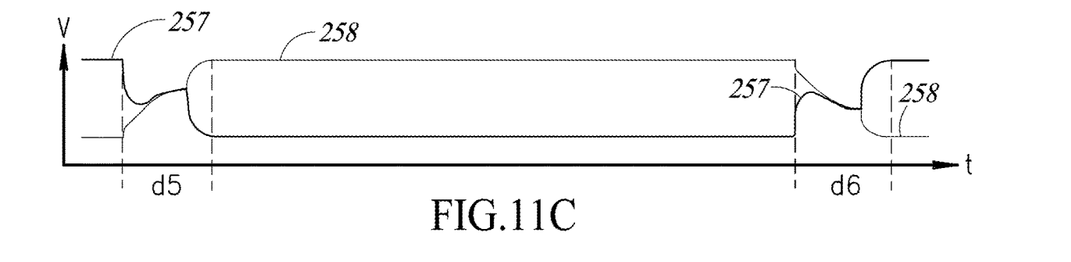

FIG. 11C shows a plot of voltage under drive conditions that utilize energy recovery only, that is, using a single buffer supplied with a single voltage, while the energy recovery rail 160 is engaged. The curve 257 represents a transition from + to − and the curve 258 represents a transition from − to +, in which energy is stored in a single induction coil for most of the time interval d5. Ideally, energy is conserved and power losses are minimized due to a transfer of energy from the four capacitors to $V_{mid}$ through the inductor L during the time interval d5. Near the end of the time interval d5, the energy recovery rail 160 is disengaged by opening the switches $ER_x$. The concerned transmit lines are then driven high or low by their respective output buffers 132. During a subsequent time interval d6, the curve 257 represents a transition from − to + and the curve 258 represents a transition from + to −. In the example of FIG. 11C, when four outputs are driven with three +/− transitions and one −/+ transitions using energy recovery and one 10 pH induction coil, the power consumed is only about 13 mW.

Figure 11D:
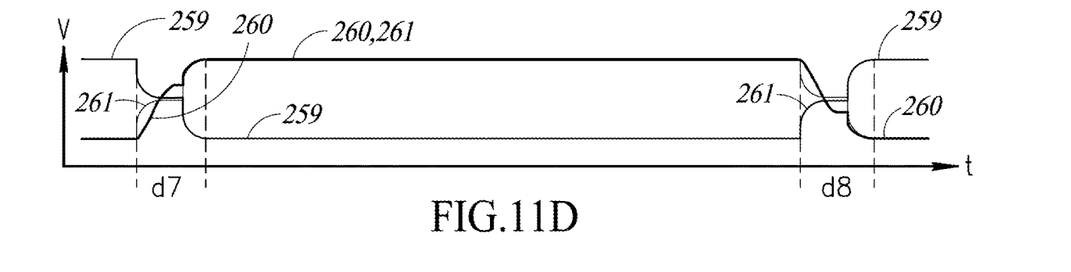

FIG. 11D shows a plot of voltage using a combination of dual-supply drive for 2 outputs and energy recovery for two others, that is, when two of the four transitions are performed using a dual-supply drive while the energy recovery rail 160 engages a single induction coil by closing the switches $ER_C$ and $ER_D$ to drive the other two of the four capacitors. During an initial time period d7, the curve 259 represents a transition from + to − and the curves 260, 261 represent transitions from − to +, in which first supply drive is used. Meanwhile, power is conserved by a transfer of energy between the two other capacitors and $V_{mid}$ via the inductor L. Near the end of the time interval d7, the energy recovery rail is disengaged by opening the switches $ER_C$ and $ER_D$. The four transmit lines $T_1$-$T_4$ are then driven high or low by their respective output buffers 132. During a subsequent time interval d8, the curve 259 represents a transition from − to + and the curves 260, 261 each represent a transition from + to −. In the example of FIG. 11D, when two outputs are driven using a dual-supply drive and two outputs are driven using energy recovery with one 10 pH induction coil, the power consumed is only about 12.5 mW. Thus, using a combination of the dual supply drive and energy recovery consumes less power than when all of the lines are driven using either one of a dual supply drive or energy recovery. The configuration illustrated in FIG. 11D, in which the dual-drive method is combined with energy recovery, provides the highest energy saving and lowest power dissipation while engaging only a single coil.

Figure 11E:
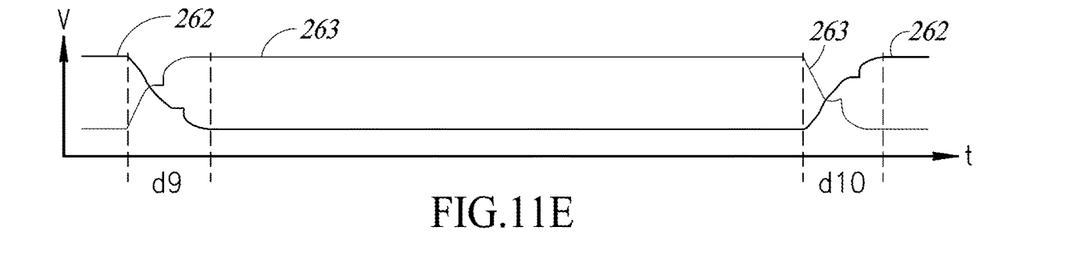

FIG. 11E shows a plot of power under drive conditions that use only energy recovery. FIG. 11E corresponds to a drive circuit implemented with two energy recovery lines, two 10 pH induction coils and associated diodes and switches for the four transit lines. Under such conditions, the dual-drive method is not used. Instead, a single supply buffer is used, and the two energy recovery rails engage the induction coils by closing the respective switches. In one embodiment, using. During an initial time interval d9, the curve 262 represents a transition from + to − and the curve 263 represents a transition from − to +, in which energy is stored in two induction coils for most of the time interval d9. A transfer of energy occurs from both induction coils to charge the four load capacitors. Near the end of the time interval d1, the energy recovery rails are disengaged by opening the switches $ER_x$. The four transmit lines are then driven high or low by their respective output buffers 132. In the example of FIG. 9E, when all four transmit lines are driven using energy recovery with two 10 pH induction coils, the power consumed is only about 9.5 mW, less than ⅓ the power consumed using the normal drive conditions of FIG. 11A.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

It will be appreciated that, although specific embodiments of the present disclosure are described herein for purposes of illustration, various modifications may be made without departing from the spirit and scope of the present disclosure. Accordingly, the present disclosure is not limited except as by the appended claims.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch screen, comprising:
   a main power supply line configured to provide a main power supply voltage;
   an intermediate voltage power supply line configured to provide an intermediate power supply voltage, the intermediate power supply voltage having a value between the main power supply voltage and a reference voltage;
   a display electrically coupled to the main power supply line;
   an array of read lines overlaid on the display;
   an array of transmit lines overlaid on the display, the transmit lines extending in a direction transverse to a direction of the read lines, the transmit lines and the read lines creating capacitive junctions where they overlap one another; and a plurality of pairs of output buffers, each pair being respectively coupled to a respective one of the transmit lines, each pair including first and second output buffers, the first output buffer of the pair having a first supply input directly connected to the main power supply line and an output directly connected to the respective transmit line, the second output buffer of the pair having a first supply input directly connected to the intermediate voltage power supply line and an output directly connected to the respective transmit line, the second output buffer of the pair of output buffers being configured to charge the respective transmit line to the intermediate power supply voltage, and the first output buffer of the pair of output buffers being configured to charge the respective transmit line to the main power supply voltage.

2. The touch screen of claim 1, further comprising:
   an energy recovery rail selectively coupling the transmit lines to one another; and
   an induction stage having an induction coil, the induction stage coupled to the energy recovery rail.

3. The touch screen of claim 2 wherein the induction stage further includes a first diode/switch pair that transmits energy stored in the induction coil to the intermediate voltage power supply line.

4. The touch screen of claim 3 wherein the induction stage further includes a second diode/switch pair that transmits energy from the intermediate voltage power supply line to the induction coil.

5. The touch screen of claim 2 wherein the induction coil is a variable induction coil that can incorporate different numbers of turns of the coil to vary an energy recovery rate.

6. The touch screen of claim 1, wherein the main power supply voltage is derived from a battery of a mobile device.

7. The touch screen of claim 1 wherein the display is a flexible display.

8. A method, comprising:
coupling a selected transmit line of a touch screen controller to a first power supply line during a first time interval, the selected transmit line having a transmit line voltage and the first power supply line having a first power supply voltage;
waiting, during a first transition time interval, for the transmit line voltage to reach the first power supply voltage;
disconnecting the selected transmit line from the first power supply line;
connecting the selected transmit line to a second power supply line, the second power supply line having a second power supply voltage that is different than the first power supply voltage; and
waiting, during a second transition time interval, for the transmit line voltage to reach the second power supply voltage, wherein the control signals further activate;
coupling the selected transmit line of the touch screen controller to an energy recovery rail during a second time interval, the energy recovery rail coupled to an energized induction coil; and
extending a third transition time interval to permit energy equalization to occur between the energized induction coil and a load capacitor coupled to the selected transmit line.

9. The method of claim 8 wherein the first power supply voltage is substantially equal to half of the second power supply voltage.

10. The method of claim 8, wherein:
coupling the selected transmit line to the first power supply includes coupling the selected transmit line to the first power supply via a first output buffer.

11. A touch screen controller, comprising:
a plurality of load capacitors coupled to a touch screen;
a plurality of drive lines configured to transmit drive signals to drive selected ones of the plurality of load capacitors; and
a plurality of pairs of output buffers, each pair being respectively associated with a respective one of the drive lines, each pair including first and second output buffers, the first output buffer of the pair having a first supply input directly connected to a main power supply line at a supply voltage and an output directly connected to the respective drive line, the second output buffer of the pair having a first supply input directly connected to an intermediate voltage power supply line at an intermediate voltage and an output directly connected to the respective drive line, the intermediate voltage being a lower voltage than the supply voltage, the second output buffer of the pair of output buffers being configured to charge the respective drive line to the intermediate voltage, and the first output buffer of the pair of output buffers being configured to charge the respective drive line to the supply voltage.

12. The touch screen controller of claim 11, further comprising:
an energy recovery rail; and
a plurality of switches coupling the load capacitors to an inductor via the energy recovery rail.

13. The touch screen controller of claim 12, further comprising a switch coupled between the inductor and the intermediate voltage power supply line to:
direct power from the intermediate voltage power supply line to the inductor when a first switch is closed; and
direct power from the inductor to the intermediate voltage power supply line when a second switch is closed.

14. The touch screen controller of claim 13 wherein at least one of the first and second switches is a compound switch.

15. The touch screen controller of claim 13 wherein at least one of the first and second switches is a synchronously controlled switch.

16. A non-transitory computer-readable memory having instructions stored thereon, the instructions being executable by a microprocessor configured to output control signals that activate:
coupling a selected transmit line of a touch screen controller to a first power supply line during a first time interval, the selected transmit line having a transmit line voltage and the first power supply line having a first power supply voltage;
waiting, during a first transition time interval, for the transmit line voltage to reach the first power supply voltage;
disconnecting the selected transmit line from the first power supply line;
connecting the selected transmit line to a second power supply line, the second power supply line having a second power supply voltage that is different than the first power supply voltage; and
waiting, during a second transition time interval, for the transmit line voltage to reach the second power supply voltage, wherein the control signals further activate
coupling the selected transmit line of the touch screen controller to an energy recovery rail during a second time interval, the energy recovery rail coupled to an energized induction coil; and
extending a third transition time interval to permit energy equalization to occur between the energized induction coil and a load capacitor coupled to the selected transmit line.

17. The non-transitory computer-readable memory of claim 16 wherein one or more of the time intervals is specified in the programmed instructions.

18. The non-transitory computer-readable memory of claim 16, wherein:
coupling the selected transmit line to the first power supply includes coupling the selected transmit line to the first power supply via a first output buffer.

* * * * *